United States Patent

Kish et al.

[15] 3,702,994

[45] Nov. 14, 1972

[54] DOMAIN PROPAGATION ARRANGEMENT

[72] Inventors: Donald Eugene Kish, North Plainfield; James Lanson Smith, Bedminster, both of N.J.

[73] Assignee: Bell Telephone Laboratories, Incorporated, Murray Hill, N.J.

[22] Filed: March 1, 1971

[21] Appl. No.: 119,492

[52] U.S. Cl. ........................340/174 TF, 340/174 SR

[51] Int. Cl...........................G11c 11/14, G11c 19/00

[58] Field of Search ...................340/174 TF, 174 SR

[56] References Cited

UNITED STATES PATENTS

| | | | |
|---|---|---|---|
| 3,530,446 | 9/1970 | Perneski | 340/174 TF |
| 3,555,527 | 1/1971 | Perneski | 340/174 TF |
| 3,573,765 | 4/1971 | Perneski | 340/174 TF |
| 3,541,535 | 11/1970 | Perneski | 340/174 TF |
| 3,541,534 | 11/1970 | Bobeck et al. | 340/174 TF |
| 3,603,939 | 9/1971 | Bobeck et al. | 340/174 TF |
| 3,599,190 | 8/1971 | Smith | 340/174 TF |
| 3,602,911 | 8/1971 | Kurtzig | 340/174 TF |
| 3,609,720 | 9/1971 | Strauss | 340/174 TF |
| 3,611,331 | 10/1971 | Bonyharb | 340/174 TF |

*Primary Examiner*—Vincent P. Canney
*Attorney*—R. J. Guenther and Kenneth B. Hamlin

[57] ABSTRACT

The displacement of single wall domains in a domain propagation medium is achieved along a straight line conductor to which bipolar pulses are applied. Discrete magnetically soft elements are disposed to respond to the in-plane components of the fields generated by the pulses to produce consecutively offset poles to displace the domain in the desired direction.

9 Claims, 11 Drawing Figures

INVENTORS D. E. KISH
J. L. SMITH
BY Herbert M. Shapiro
ATTORNEY

DOMAIN PROPAGATION ARRANGEMENT

FIELD OF THE INVENTION

This invention relates to data processing arrangements and more particularly to such arrangements in which information is represented as single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving such a domain are designed to produce magnetic fields of a geometry determined by the layer in which a domain is moved. Most materials in which single wall domains are moved are characterized by a preferred magnetization direction, for all practical purposes, normal to the plane of the layer. A single wall domain, in this context, constitutes a reverse magnetized domain which may be thought of as a dipole oriented transverse, nominally normal to the plane of the layer. The movement of the domain is accomplished by the provision of an attracting magnetic field normal to the layer and at a localized position offset from the position occupied by the domain. A succession of such fields causes continuous movement of a domain as is well known.

One propagation arrangement comprises a pattern of electrical conductors each designed to form conductor loops which generate the requisite fields when externally pulsed. The loops are interconnected and pulsed in a three-phase manner to produce shift register operation. But since the conductors must carry currents, their cross sections have to be above a (current carrying) minimum achieved by plating onto a deposited film. If maximum packing density is to be achieved, the spacings between adjacent conductor films is extremely small. Consequently, the plating operation results in short circuits on occasion. A simpler conductor geometry avoiding conductor loops simplifies this problem.

An alternative propagation arrangement employs a pattern of soft magnetic elements adjacent the surface of a layer in which single wall domains are moved. In response to a magnetic field reorienting in the plane of the layer, changing pole patterns are generated in the soft magnetic, typically permalloy, elements. The elements are arranged to displace domains along a selected path in the layer as the in-plane field reorients. The familiar T-bar overlay arrangement, for example, responds to a rotating in-plane field to so displace domains. Arrangements of this type are called "field access" arrangements and have the virtue of eliminating conductors and external lead connections, a significant advantage particularly if high packing densities are to be achieved. Circuits of the field access type are presently being fabricated within excess of a million bits per square inch.

Of course, field access circuits do not provide for movement of a selected domain in a layer. On the other hand, field access circuits are compatible with electrical conductors. Propagation arrangements which employ both conductors and magnetic elements are called "hybrid" propagation circuits and typically permit some selectivity in domain movement while achieving a very simple straight line conductor geometry. A straight line geometry (minimum length) leads to minimum impedance which, in turn, leads to relatively low power dissipation.

BRIEF DESCRIPTION OF THE INVENTION

In accordance with the present invention, a propagation channel for single wall domains is defined in a suitable magnetic layer by a straight line electrically conducting strip along which magnetically soft elements are disposed vertically with respect to the axis of the strip and offset laterally with respect to one another in a repetitive geometry. Bipolar currents are applied to the conductor to produce fields the in-plane component of which generates attracting pole patterns in consecutive overlay elements; the component normal to the layer is always in a direction to move domains toward the attracting poles of the overlay elements.

In one embodiment, consecutive patterns of long and short element pairs extend over the straight line conductor protruding first to one side thereof, then to the other—four elements to a period—disposed vertically with respect to the axis of the conductor.

DETAILED DESCRIPTION

Figure 1:
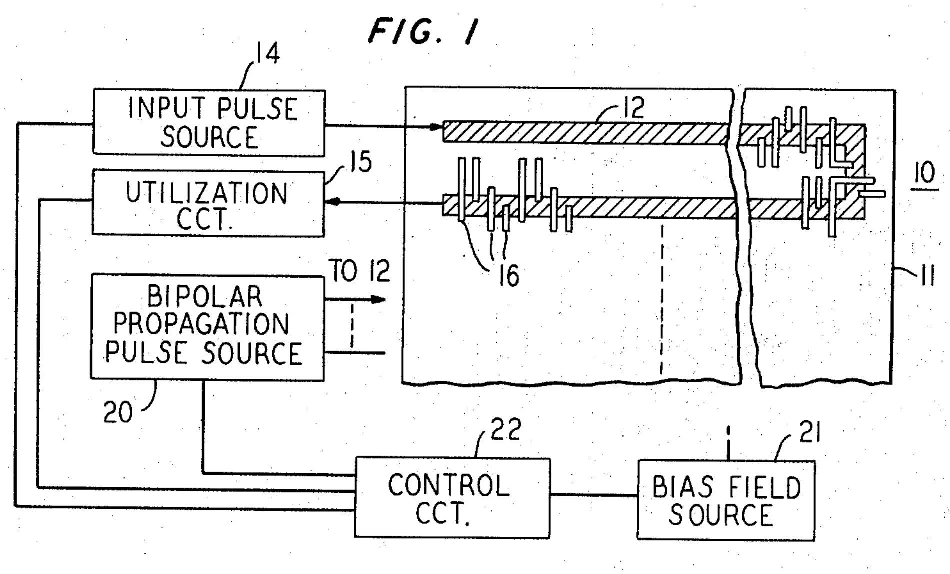
FIG. 1 is a schematic illustration of a domain propagation arrangement in accordance with this invention.

FIG. 1 shows a domain propagation arrangement 10 in accordance with this invention. The arrangement comprises a layer 11 of a material in which single wall domains can be moved.

A single conductor 12 is shown adjacent the surface of layer 11 for defining a representative propagation channel for domains in layer 11. The conductor is shown having a U-shaped geometry so that the movement of domains around corners and in at least two different directions in layer 11 can be illustrated.

Input and output positions to the top and bottom left of conductor 12 in FIG. 1 are coupled to input pulse source 14 and utilization circuit 15, respectively.

A repetitive pattern of magnetically soft elements, four elements to a period, are aligned vertical to the axis of conductor 12 as represented by the rectangles 16 in FIG. 1. Only the elements of a representative period of the pattern are designated for simplicity. In response to bipolar pulses applied to conductor 12, a sequence of attracting poles are generated in the elements of each period of the overlay to displace domains properly located to be influenced by those poles. For this purpose, conductor 12 is connected between a bipolar propagation pulse source 20 and ground as indicated in FIG. 1.

A bias field source 21 is employed for maintaining a constant domain diameter during operation.

Sources 14, 20, and 21 and circuit 15 are connected to a control circuit 22 as represented in FIG. 1 for synchronization and activation. Such sources and circuits may be any such elements capable of operating in accordance with this invention.

Figure 2A:
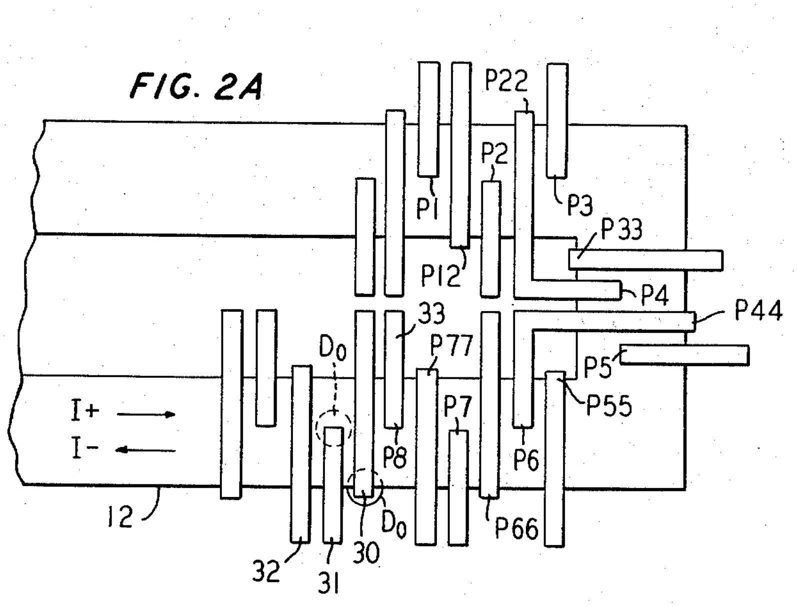
FIGS. 2A, 2B, 2C, and 3A, 3B, 3C, 3D, and 3E are schematic illustrations of portions of the arrangement of FIG. 1.

FIG. 2A shows an enlarged view of the conductor 12 with the magnetically soft transverse elements for achieving propagation herein. Consider the pole pattern generated in the elements for each of the pulses $I_+$ and $I_-$ poled for current flow in the direction of the associated arrows directed to the right and to the left, as shown in the FIG, respectively. It is helpful to recognize that the current in conductor 12 generates a magnetic field with a component normal to layer 11 and a component in the plane of layer 11. The normal component in each instance will be seen to be in a direction to urge a domain toward attracting poles established in the magnetically soft elements. The in-plane component will be seen to establish the pole pattern in those elements.

Figure 2B:
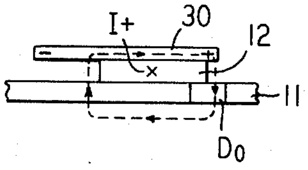
Figure 2C:
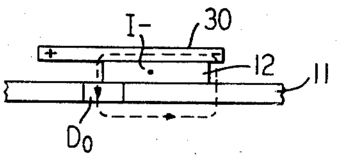

The component normal to layer 11, for example, operates to move a domain from a position at the top of conductor 12 in FIG. 2A to a position at the bottom of conductor 12 causing no movement of a domain along the axis of the conductor. This is clear from FIG. 2B and FIG. 2C which are cross sections of the position of overlay element 30 in the propagation channel of FIG. 2A. FIG. 2B shows the field generated by a current $I_+$ in FIG. 2A whereas FIG. 2C shows the field generated by the current $I_-$ in FIG. 2A. The right-hand rule indicates that flux is directed clockwise as viewed in FIG. 2B and counterclockwise as viewed in FIG. 2C. Consequently, a domain $D_o$ in layer 11 associated with element 30 and having a magnetization directed into layer 11 as viewed in FIG. 1 finds a least energy state at the edge of conductor 12 adjacent the right end of element 30 as viewed in FIG. 2B. In FIG. 2C, on the other hand, domain $D_o$ finds a least energy state to left of conductor 12 adjacent the left end of element 30. In the absence of additional drives due to the in-plane component of the field, domain $D_o$ is merely shuttled between the laterally displaced positions shown for it in FIGS. 2B and 2C.

Now we direct our attention to the in-plane component and consider the effect of the pole pattern generated in the overlay elements thereby on domain $D_o$ in FIG. 2A. Remember in this embodiment, conductor 12 is between the overlay elements and layer 11. Accordingly, the in-plane field component associated with a current pulse $I_+$ is directed downward as viewed in FIG. 2A generating positive and negative poles at the bottom and top ends, respectively, of all the overlay elements aligned with the component. This is represented by the + and − signs associated with element 30 of FIGS. 2B and 3A.

We will adopt the convention that a domain is attracted to positive poles and take the position of the positive poles in element 30 as a convenient starting point in the description of the movement of a representative domain. It is to be understood, however, that the truth of the assumption, in practice, depends on the actual direction of magnetization of a domain into or out of the plane of layer 11 as viewed in FIG. 1. It should be clear that the opposite assumption is true if the domain magnetization is directed upward out of the plane of layer 11 in FIG. 1. But the choice is incidental to an understanding of the invention and is not discussed further herein.

Figure 3A:
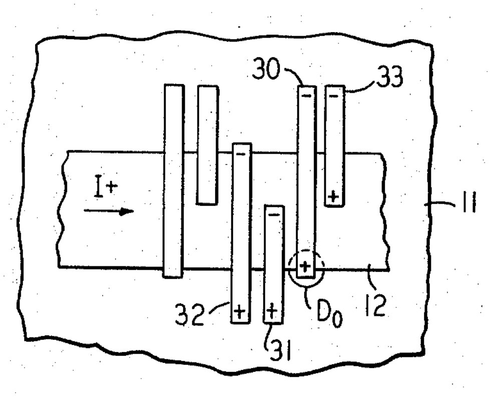
Figure 3B:
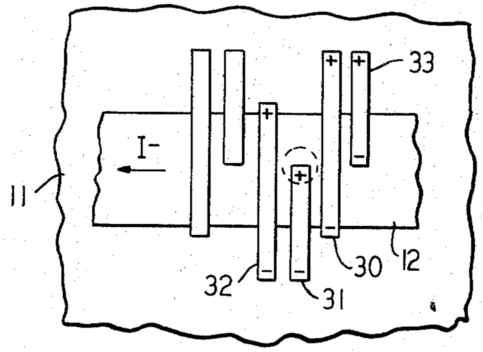

When a current pulse of opposite polarity, $I_-$, is impressed in conductor 12, domain $D_o$ moves to the left and upward as viewed in FIGS. 2A and 3B. The reason for this is twofold. First, as has been stated, the normal component shuttles a domain laterally with respect to the axis of conductor 12. Secondly, the in-plane component establishes attracting and repelling poles to displace the domain to the left as viewed in FIG. 2A.

To be specific, when the pulse of opposite polarity, $I_-$, is applied, the magnetic condition which exists in the overlying elements changes from that shown in FIG. 2B and 3A to that shown in FIG. 2C and 3B. In response, the top and bottom ends of elements 31 and 32 of FIG. 3B become poled positive and negative respectively because of the in-plane field component whereas the normal field component urges a domain upwards as viewed in the FIG. In addition, the in-plane field component generates positive and negative poles at the top and bottom of element 33 of FIG. 3B. Domain $D_o$, moving upward, is attracted by the positive poles at the top of element 31 and is repelled by the negative poles at the bottom of element 33. Consequently, domain $D_o$ moves to the top of element 31 in FIG. 3B.

Figure 3C:
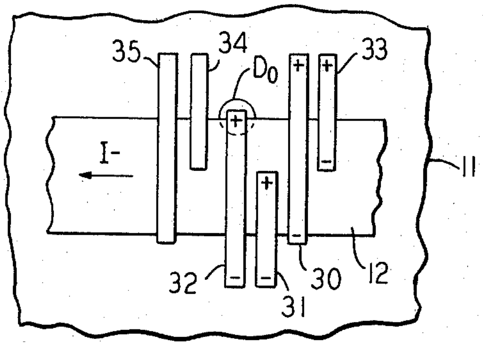

But domain $D_o$, in so moving, also "sees" an attracting pole at the top of element 32. Before pulse $I_-$ is terminated, domain $D_o$ moves to the position in layer 11 corresponding to the top of element 32 as shown in FIG. 3C.

Figure 3D:
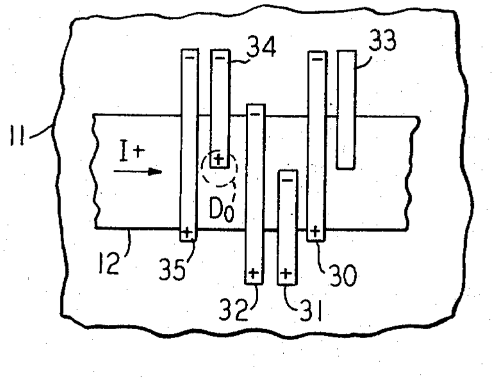
Figure 3E:
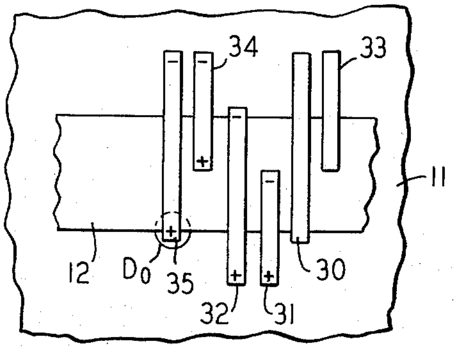

At this juncture in the operation, the current polarity in conductor 12 is reversed as shown in FIGS. 2B, 3D, and 3E. Consequently, the normal component of the associated field moves the domain downward as viewed in the FIG. whereas positive poles on the bottom of elements 34 and 35 attract the domain to the left. At the same instant, negative poles at the top of elements 31 and 32 repel the domain. Therefore, during the pulse $I_+$, the domain $D_o$ moves first to the position associated with the bottom of element 34, then to the position associated with the bottom of element 35 as shown in FIG. 3E.

A comparison between FIGS. 3E and 2A (or 3A) indicates that the domain has been moved along one period of the overlay pattern. It should be understood that similar changes in magnetic conditions occur simultaneously in the elements of every period of the pattern to affect domains located in corresponding positions there. Consequently, a shift register results where the presence and absence of domains can be moved controllably along the axis of the conductor to which bipolar pulses are applied. Of course, if a number of such conductors are provided as indicated in FIG. 1, selective movement is achieved by selecting for pulsing only the conductor along which propagation is desired.

It is to be recognized also that domain movement is achieved in the same manner even if conductor 12 is not a straight line. For example, FIG. 2A shows conductor 12 in a U-shape. The magnetically soft elements are shown in that FIG for moving a domain to the right along the top part of conductor 12 as viewed in FIG. 2A and downward at the right end of the conductor before moving to the left along the bottom part of conductor 12 as described above. The consecutive positions for a domain so moving in response to repetitive pulse sequences as described in connection with FIGS. 3A, 3B, 3C, 3D, and 3E are designated $P_1$, $P_{12}$, $P_2$, $P_{22}$, $P_3$, $P_{32}$, $P_4$, $P_{42}$,---$P_8$ in FIG. 2A. The arrangement of magnetically soft elements at the turns is such as to exhibit only negligible difference in pole arrangement from what is exhibited over a straight run along conductor 12 as is clear from the FIG.

Domains, so moved, are introduced to the left at the top of conductor 12 as shown in FIG. 1 and detected to the left at the bottom of conductor 12 illustratively. Suitable input and detection arrangements for coupling to layer 11 of FIG. 1 are well known and not described here in detail but are merely represented by blocks 14 and 15 as mentioned above.

The movement of a domain from its position associated with the bottom of element 30 in FIG. 3E to the top of element 31 and then to the top of element 32 is along a line illustratively at an angle of 45° to the axis of conductor 12. This angle is chosen to take advantage of both the normal and in-plane components of the drive field in moving a domain. In practice, the angle which consecutive positions make with respect to the drive conductor axis will reflect the relative magnitudes of the in-plane and normal components of the drive field as modified by the lengths of the magnetically soft elements. Naturally, the straighter the actual domain path length, the shorter the distance the domain travels from bit location to bit location. Regardless of the chosen angle, the efficient use of the in-plane component of the drive field to provide both a push and a pull to displace a domain along the axis of the conductor in each instance is particularly efficient for applying the drive field across a domain. The resulting arrangement, thus, is an efficient hybrid domain propagation arrangement which provides a degree of selectivity in domain movement.

Figure 4:
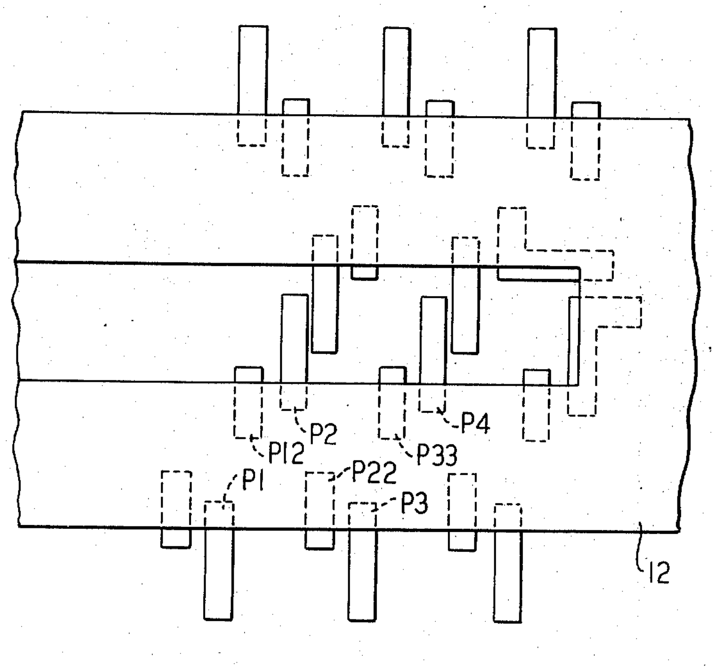
FIGS. 4 and 5 are schematic illustrations of positions of alternative arrangements for domain propagation in accordance with this invention.

In the above embodiment, conductor 12 is assumed to lie between layer 11 and the magnetically soft pattern. This need not be the case. FIG. 4 shows a portion of a propagation arrangement in accordance with the principles of the invention wherein the magnetically soft elements are between layer 11 and conductor 12.

Operation is entirely analogous to that described above, consecutive positions for a domain being designated $P_1$, $P_{12}$, $P_2$, $P_{22}$, $P_3$, $P_{33}$, $P_4$ ---, as above, for alternations of the drive pulses as described in connection with FIGS. 3A through 3E. It is noted that the magnetic elements are illustratively shorter than was the case in the previous embodiment. That is to say, none of the long elements extend across conductor 12 and none of the short elements extend to the center line of the conductor. This is because, in this embodiment, when the normal component of the conductor field is in a direction to move domains from the top to the bottom of the conductor, the in-plane component of the field necessarily creates attracting rather than repelling poles at the top of the magnetically soft elements (as viewed) and we want to use as little area outside of the propagation channel as possible in order to maximize capacity. Nevertheless, operation can be seen to proceed as described above.

Figure 5:
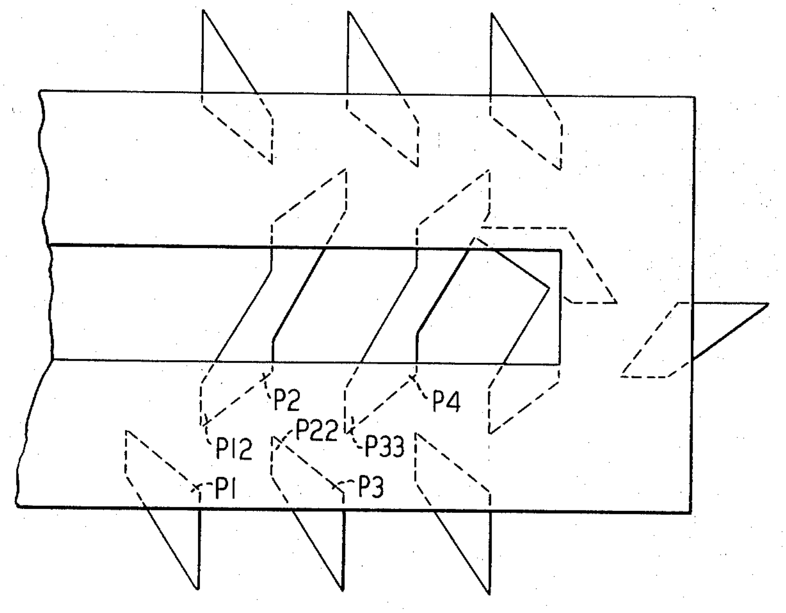

FIG. 5 shows an embodiment wherein sloped magnetically soft elements are positioned with respect to conductor 12. In response to current pulses applied as discussed in connection with FIGS. 3A through 3E, a domain is moved to consecutive positions as defined above and designated similarly as $P_1$, $P_{12}$, $P_2$, $P_{22}$, $P_3$ etc. In this embodiment, the ramp-shaped elements are disposed between conductor 12 and layer 11.

Of course, in the last two embodiments, a layer of high permeability on the side of layer 11 opposite that adjacent to conductors 12 and the magnetically soft elements above performs a keeper function which increases the amount of the drive field applied across any given domain moved in accordance with the principles of this invention.

An advantage to an arrangement in accordance with this invention is the fact that both the conductors and magnetically soft layers are of simple geometry which permits very high packing densities without risk of short circuits as mentioned above. A recitation of the dimensions of a typical arrangement in accordance with this invention illustrates this point. For epitaxial garnet films, a typical domain diameter is 5.0$\mu$ (where $\mu$ = micron). For moving such domains where, for example, the magnetically soft elements lie between layer 11 and conductor 12, as described, conductor 12 has a cross section typically 24$\mu$ × 12$\mu$, and the magnetically soft elements are typically 5.0$\mu$ × 12$\mu$ (or 20$\mu$) × 5,000 A spaced apart 2.5$\mu$. Such dimensions lead to a period of 30$\mu$ or a packing density of $5\times10^4$ bit/cm$^2$. With domains having diameters of about 2.0$\mu$, packing densities in excess of 1 million bits per square inch can be achieved.

Arrangements of the type described herein are fabricated in accordance with well understood photolithographic techniques. The negative of the conductor pattern, may, for example, be formed in an insulting layer overlying layer 11 of FIG. 1 by selective etching for providing a planar surface for the deposition of the magnetically soft elements once the conductors are formed.

What has been described is considered only illustrative of the principles of this invention. Therefore, various modifications may be desired, by those skilled in the art, in accordance with those principles within the spirit and scope of this invention.

What is claimed is:

1. A magnetic domain propagation arrangement comprising a layer of material in which single wall domains can be moved, an electrical conductor adjacent a surface of the layer for defining a first path therein, means for impressing bipolar current pulses in said conductor for generating first and second magnetic fields to move a domain back and forth thereacross, and means responsive to said first and second fields for advancing said domains along said first path wherein said last-mentioned means comprises a pattern of discrete elements aligned transverse to said path in a manner to convert said back and forth movement of domains into domain displacement along said path.

2. An arrangement in accordance with claim 1 wherein said layer has a preferred direction of magnetization along an axis nominally normal to the plane of the layer and said domains are magnetized along said axis and wherein each of said first and second magnetic fields has a component along said axis and in the plane of said layer.

3. An arrangement in accordance with claim 2 wherein said elements are arranged in a repetitive pattern along said path, each of said elements having a long dimension aligned vertically with respect to said conductor in the plane of said layer.

4. An arrangement in accordance with claim 3 wherein said elements are arranged in sets of four including first and second pairs of elements, each of said pairs extending over said conductor, the elements of said first and second pairs extending beyond first and second sides of said conductor respectively.

5. An arrangement in accordance with claim 4 wherein each of said pairs includes a long and a short element, a first element of said pair extending from about one side of said conductor well beyond the other side and the second element of said pair extending from the center line of said conductor equally beyond the other side.

6. An arrangement in accordance with claim 4 wherein the ends of said elements exhibit changing pole patterns in response to said first and second fields to move domains along a zigzag path with segments transverse to said path.

7. An arrangement in accordance with claim 6 wherein said segments are at ±45° with respect to said path.

8. An arrangement in accordance with claim 3 wherein said elements are arranged in repetitive patterns of first and second elements of ramp-shaped elements disposed between said conductor and said layer extending from beneath said conductor to first and second sides thereof, respectively, for displacing said domains along a zigzag path with respect to said conductor.

9. A magnetic domain propagation arrangement comprising a layer of material in which single wall domains can be moved and means for moving single wall domains along a path in said layer, said means comprising an electrical conductor aligned along said path and means for applying bipolar current pulses to said conductor said conductor being operative when pulsed to move domains back and forth thereacross along with a repetitive pattern of magnetically soft elements aligned transverse with respect to said path in positions offset laterally with respect to one another to generate attracting pole patterns to displace domains so moved across said conductor along said path in response to the fields associated with said pulses.

* * * * *